United States Patent [19]

Levin

[11] Patent Number: 4,969,097

[45] Date of Patent: * Nov. 6, 1990

[54] METHOD OF RAPID ENTERING OF TEXT INTO COMPUTER EQUIPMENT

[76] Inventor: Leonid D. Levin, 106 Deborah Rd., Newton, Mass. 02159

[*] Notice: The portion of the term of this patent subsequent to Jul. 26, 2005 has been disclaimed.

[21] Appl. No.: 222,659

[22] Filed: Jul. 21, 1988

Related U.S. Application Data

[63] Continuation-in-part of Ser. No. 777,311, Sep. 18, 1985, Pat. No. 4,760,528.

[51] Int. Cl.⁵ .................. B41J 5/30; G06F 15/38
[52] U.S. Cl. ........................... 364/419; 400/98
[58] Field of Search ... 364/200 MS File, 900 MS File, 364/419; 400/98

[56] References Cited

U.S. PATENT DOCUMENTS

| | | | |
|---|---|---|---|
| 3,950,734 | 4/1976 | Li | 364/900 |
| 4,374,625 | 2/1983 | Hanft et al. | 400/98 |
| 4,396,992 | 8/1983 | Hayashi et al. | 364/900 |
| 4,459,049 | 7/1984 | Howell et al. | 400/98 |
| 4,464,070 | 8/1984 | Hanft et al. | 400/98 |
| 4,760,528 | 7/1988 | Levin | 364/419 |
| 4,791,587 | 12/1988 | Doi | 364/419 X |
| 4,893,238 | 1/1990 | Venema | 364/419 |

FOREIGN PATENT DOCUMENTS 0078673  4/1987  Japan .

OTHER PUBLICATIONS

Todd, S. J. P. "Abbreviated Typing for Word Processing", *IBM Tech. Discl. Bul.*, vol. 21, No. 9, Feb. 1979, 3796–7.

*Primary Examiner*—Clark A. Jablon
*Attorney, Agent, or Firm*—Pollock, Vande Sande & Priddy

[57] ABSTRACT

A method and apparatus for rapidly entering text into a computing machine is described. An operator may enter text in abbreviated form using several simple rules to predict which abbreviated word forms will be correctly recognized. In the event of conflicts (where one abbreviated word matches more than one full text work), the operator selects the preferred resolution either on an individual or global basis.

25 Claims, 5 Drawing Sheets

METHOD OF RAPID ENTERING OF TEXT INTO COMPUTER EQUIPMENT

RELATED APPLICATION

This application is a continuation-in-part of my prior copending application Ser. No. 777,311, filed Sept. 18, 1985, now U.S. Pat. No. 4,760,528. The disclosure of my prior application is incorporated herein.

DESCRIPTION

1. Field of the Invention

The present invention relates to an improvement in word processing, more particularly a rapid method of entering words into computer equipment with a reduced number of keystrokes.

2. Background Art

The application of computing equipment in the office environment, and in the home, has shown rapid growth. Once the text of a document has been entered into the computer memory, there are a host of programs available for editing, formatting, spelling, etc. However, there is very little in the way of a comprehensive technique for rapidly entering the alphabetic characters which form the document, other than requiring an operator to keystroke each of the characters.

Several word processing programs offer "macro" capabilities, wherein a limited number of keystroke combinations can be encoded in a much shorter number of keystrokes. While this does provide some advantage to the operator, the limited nature of the "macro" capability severely limits its wide application or comprehensive use.

Accordingly, it is an object of the invention to provide a technique for rapidly entering alphabetic information into a computer memory. It is another object of the invention to provide such a technique which is readily learned, is much more comprehensive than the limited "macro" capability, and can be applied to a wide variety of fields.

Furthermore, it is an object of the invention to satisfy the foregoing objective with a system which enables a user to predict (without memorization) what few keystrokes (less than the number of characters in a word) will be recognized as a word.

SUMMARY OF THE INVENTION

The invention meets these and other objects in use with computing equipment such as for example the typical microcomputer. Typical microcomputers include a processor, memory, input equipment such as a keyboard, and output equipment such as a video display, printer, etc.

The invention includes a plurality of predefined files and a program which, when run, implements the method of the invention. The predefined files include at least one word file. The word file is a comprehensive file which includes a large number (thousands) of words. One or more word modification files may also be included. A word modification file is for example a prefix or a suffix file. The word modification files include at least two entries for each word modification. A first entry is the word modification itself, e.g. a prefix or a suffix, and a second entry is a single character used to represent the word modification.

Based on the foregoing simple description of, for example, a word file, a prefix file and a suffix file, operation of the method can be explained.

The operator enters text which is either full text words, word abbreviations or modified word abbreviations, where the word abbreviations or modified word abbreviations are selected according to a plurality of predefined rules. In order to enable the operator to readily grasp which word abbreviations can be employed, a simple set of rules are defined, for the operator's convenience. For example, one set of rules which could be used include the following rules:

(1) Simple words are defined by using the first two and last two characters (other alternatives are the first four characters, the first three and last, or first and last three), (2) A prefix word is defined by using a single character for the prefix, and up to the four characters that follow the prefix, (3) A suffix word is defined by using the first four (or less) characters of the word preceding the suffix and the character identifying the suffix, and (4) A prefix/suffix word is defined by a character for the prefix, up to the four characters following the prefix and a character for the suffix.

Assuming the operator is familiar with the rules, it is relatively simple for the operator to enter text using the rules. For example, if the operator wishes to enter the word "aircraft", this is a simple word (there is no prefix or suffix) and thus it is entered as the four character group "aift".

If the operator desires to enter the word "condominium", this can be recognized as a word with the "con" prefix. Since a character may identify the prefix "con", such as the character -c-, the operator enters the word by using the character group "cdomi". The character -c- represents "con" and the next four letters are the succeeding four letters of the word, i.e. "domi". If the operator desires to enter the word "possibility", the entry is "posst", the first four characters of the word plus the character -t- identifying the suffix "ty".

The parameters of the four rules are preferred, but it should be apparent that more than a single character could be used to identify a word modification and more or less than four characters could be used for simple words. As will be described, reducing the number of characters may lead to more conflicts, while increasing the number of characters could be faulted as reducing efficiency.

After the operator has entered a block of text in the foregoing fashion, the computer is instructed to translate the abbreviated text into full text. It is within the scope of the invention to use real time processing (where words are processed as entered) in lieu of batch mode processing.

Abbreviated words or character groups are recognized in the same fashion that full text words are recognized, i.e. by the leading and trailing space. When the computer identifies a word, it first checks the word modification files with respect to the leading and trailing characters. This identifies whether a word modification (prefix or suffix) is a possibility. For example if the leading character is not found as the character representing a prefix, then there is no prefix word modification. Similarly, if the trailing character is not found in the suffix file as a character identifying a suffix, then there is no suffix. Continuing with this example, the computer then compares the word being processed with the word file, using the rules identified above. If the entered character group can be correlated with a full text word in the word list using the rules previously specified, then a word is recognized or a match is made. The character group, in the text entered by the operator then, is replaced by the matched word in the word list.

On the other hand, if the review of the prefix file indicated that there was a possibility of the word being a prefix word, then the entered character group is modified by adding to it, in lieu of the leading character, an appropriate prefix or prefixes. This will necessitate a search of the word list based on more than a single possibility. For example, the prefix indicator -c- could represent multiple prefixes such as "com", "con", or "cor" prefix or the leading character could simply be a leading character of the word (and not represent a prefix). Thus if the operator had entered "cdomi", the computer would have replaced the -c- with three possible prefixes so that, as modified, the computer would be searching the word list for "comdomi", "condomi" or "cordomi", as well as searching for "cdomi".

With these possibilities, the computer then goes to the word list. In connection with "comdomi", there will be no match since in one example the word list has the word "combines" followed by "come" ("comdomi" follows "combines" alphabetically and would precede "come"). For "condomi" of course the word "condominium" will be found. For the possibility "cordomi", there will be no match since the word list includes "cordially" followed by "corner".

Prior to the processing just described, the word list is initialized using the rules implemented by the system to identify the abbreviations that will be recognized. Thus, for each word the initialization generates a corresponding abbreviated word. With this initialization, the search of the word list merely requires a match between the character group entered by the operator (or that character group modified by the appropriate prefix and/or suffix) and the abbreviation generated by the system.

In case the number of possibilities presented for searching results in more than a single match, then the computer extracts both (or all if there are more than two) matches, signals the operator that there is a conflict, and presents the operator with an option to select either one of the matches as the appropriate word to be entered in lieu of the character group physically entered by the operator.

Conflict resolution can be automated to a further level. For example at the same time a conflict situation is presented to the operator and the operator is requested to resolve the same, the operator can also be prompted to indicate whether or not each other instance of the same conflict should be resolved in the identical way (global resolution). This will reduce the necessity for the operator to view each different conflict situation.

While the example described above makes use of conventional keyboard type data input, the invention is not at all restricted to characters entered via keyboard. For example, the operator may manually write shortened versions of words on paper using the rules described above (or similar rules), have the written paper then optically scanned to produce the textual data on which the invention can operate.

In the examples already given, and in some of the examples to be given below, the language in which words are formed is English. It should also be apparent to those skilled in the art that the invention is not at all restricted to the English language and other alphabetic languages such as German, French, Spanish, etc. are candidates for application of the present invention. Prefix/suffix tables for French, German and Spanish languages are also presented at Tables 24.

Furthermore, in the example discussed above, the word modification indicators are alphabetic characters. It should also be apparent however that that is not at all essential to the invention and in fact any character, symbol or the like can be used as a word modification indicator.

In addition, while four rules have been specifically identified, it should also be apparent that additional rules can be used. For example, one additional rule which is used in an embodiment of the invention which has actually been constructed identifies compound words by the first two characters of the leading word and the last two characters of the trailing word, separated by a symbol such as . Use of the rule is of course not essential to the invention, but application of the rule does reduce the number of conflicts in processing.

In a preferred embodiment of the invention, the functions which have been described are used in conjunction with more conventional word processing functions to create store and retrieve files, reformat text, manage files, create, move and edit footnotes, support graphics, indexing, various printers, and functions such as mail merge, outlining, document tracking, spell checking, etc.

Accordingly, the invention provides, in one aspect, a method of rapidly entering text represented by alphabetic characters into a computing machine comprising a processor, memory and a display, said method comprising the steps of:

(a) storing a file of words, (b) storing a file of word modifications correlating one or more word modification indicators and a corresponding word modification, (c) entering, into said computing machine, character groups representing words and word modification indicators, (d) for each instance of a word modification indicator, searching said word modification file and extracting one or more possible word modifications to produce for each extracted word modification a modified character group, (e) thereafter, searching said file of words for a match between a character group or a modified character group and a word, and (f) replacing a matched character group in said entered text with a corresponding full word.

In accordance with another aspect, the invention provides:

a method of rapidly entering text represented by alphabetic characters into a computing machine comprising a processor, memory and a display, said method comprising the steps of:

(a) storing a file of words, and (b) entering, into said computing machine character groups representing words, by entering for a selected word a selected set of characters of said word identified in accordance with character position in said word.

BRIEF DESCRIPTION OF DRAWINGS

The invention will now be described in such detail as to enable those skilled in the art to make and use the same when taken in conjunction with the attached drawings in which.

DETAILED DESCRIPTION OF A PREFERRED EMBODIMENT

Figure 1:
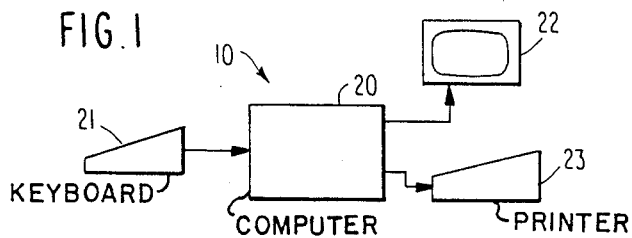
FIG. 1 is a block diagram of a typical microcomputer system such as is employed with the present invention.

As shown in FIG. 1, a typical microcomputer system 10 includes a processor unit 20 which contains the processor and allied electronic equipment. This may include for example magnetic disk storage equipment such as floppy disk drives and/or hard disk drives. Either of these drives can be used for storage of the program, and permanent storage of text files either as entered by the operator or as processed in accordance with the present invention. Peripheral equipment for the processor unit 20 includes an input device such as the keyboard 21. Other peripheral equipment includes output devices such as the video display terminal 22 and the printer 23. All of the foregoing components are conventional and no further description of them is required.

In accordance with the present invention at least two files are made available to the processor unit 20, typically on a floppy disk although as is understood by those skilled in the art, files originating on a floppy disk can be transferred to a hard disk. One of the files is a word file; this file includes a very large number (in the thousands) of words. A second file is a word modification file. The word modification file has two components for each entry. One of the components is a word modification indicator, typically a single character. The other component of an entry is one or more word modifications. Table 1 reproduced below shows two examples of a word modification file, one representing prefixes and the other representing suffixes.

TABLE 1

| Prefixes | | Suffixes | |
|---|---|---|---|
| ac al ap as | a | al | a |
| com con cor | c | ance ce ence | c |
| de di dis | d | ed | d |
| per pre | e | ate se te | e |
| for fore | f | ing | g |
| im in inter | i | tion | h |
| en | n | ly | i |
| pro | p | age ge | j |
| re | r | able ible le | l |
| sub sup super | s | ant ent ment nt | n |
| trans | t | or | o |
| un under | u | er | r |
| ex | x | es | s |
| | | ty | t |
| | | ure | u |
| | | ive ve | v |
| | | cy ry | y |
| | | sion | z |

In order to rapidly enter alphabetic information in accordance with the present invention, the operator keystrokes abbreviated text into the keyboard 21. The abbreviated text may include a plurality of character groups. Character groups are usually separated by spaces (indicated by use of the conventional space bar on the keyboard 21), carriage returns, etc. A character group may comprise a full word. However, for words longer than a predefined number of characters (for example words longer than four characters), the operator need not key each character of the word. Rather, using some simple rules which will be defined below, the operator keys in a character group which is smaller than the intended word. For some words the character group may comprise the initial two characters and the last two characters of the intended word (other conventions such as the first or last four characters, first three and last, first and last three, etc. are also possible). In the event that the intended word includes one of the word modifications stored in the word modification file, the operator will key in (for example for a prefix word) a character representing the word modification indicator, and several other characters from the intended word (such as the four characters following the prefix or all characters following the prefix if there are less than four characters following the prefix). Similarly, for a suffix word, the operator may key in several characters from the intended word followed by the word modification indicator as the trailing character.

After the operator has keyed in (in one embodiment) a given amount of text, in the abbreviated form just described, the operator will initiate processing in accordance with the present invention. In accordance with that processing, the different character groups in the entered text will be treated in turn. Taking up a typical character group, it will be checked for the presence of a word modification indicator. Assuming no word modification indicator is present, then the computer will refer to the word file and attempt to match the character group with one or more words in the word file using the predefined rules. If only a single match is found, then the character group being processed will be replaced, in the entered text by the word matched in the word file. If more than a single word match is found, the operator will be presented with a display showing all of the matches. Thereafter, the operator is allowed to select one of the matched words. The operator-selected matched word is then used to replace the corresponding character group in the entered text. If there are many identical conflicts, the operator may select a global resolution to resolve all identical conflicts in an identical fashion.

If on the other hand a word modification indicator is located, then the other component of the word modification file is used to produce a modified character group. The modified character group is simply the original character group wherein the word modification indicator has been replaced by the corresponding entry in the word modification file. Thereafter the same matching attempt is made between the modified character group (and the originally entered character group) and the word file.

In addition to using the word file and the word modification file, the invention also provides additional files for frequently used words and frequently used phrases. In accordance with one embodiment of the invention, use is made of a character group consisting of a single character. In the English language for example, there are only two single character words (a and I). Thus are 24 other characters in the alphabet which can be used to represent 24 different frequently used words (sometimes called buzz words). When a single character group (which is not an a or an i) is located, then reference is made to the frequently used word file and the single character group in the entered text is replaced by the corresponding entry.

Multi-word character groups (for example two character groups) can be used in a similar fashion to identify either other frequently used words or frequently used phrases.

Those skilled in the art are aware that there are many word processing applications which use relatively unique vocabularies. The present invention provides the operator with the ability to alter any or all of the foregoing files by for example adding words to the word file, adding word modifications to the word modification file, adding frequently used words or phrases to the other files. To assist the operator with these changes, the invention also provides for a count field in the word file, frequently used word file, or frequently used phrase file. Thus, after a period of some use, the operator can examine the count fields to determine which frequently used words or frequently used phrases or words are being used more than others. In some instances the operator may desire to delete words, frequently used words, or frequently used phrases from the corresponding files and perhaps substitute other more frequently used combinations.

The operator need not use shortened character groups in lieu of intended words, although maximum efficiency is of course found when shortened character groups are used in lieu of intended words. However, there is a byproduct in using the invention even to the extent that intended words are actually keyed in full. Because all character groups are processed, when the operator has incorrectly spelled an intended word, even where entered in full, the processing will identify the lack of a match and thus call the operator's attention to a potential misspelling.

In the embodiment of the invention being described, shortened character groups are not used for simple words of four or less characters. In order to speed processing, four character words (which are entered in full) are distinguished from shortened character groups by the use of a unique symbol such as using the upper case form for the last letter in a four character word which has been keyed in full.

Prior to executing a typical operation the system, based on the existing data base, initializes the word list by breaking the word list into various categories, simple words, prefix words, suffix words, prefix/suffix words, compound words, double character phrases, etc. In each category, the system identifies those shortened character groups which "match" each word. Furthermore, in each category the words are indexed by length, e.g. a sub-category for 8-character words, a next subcategory for 9-character words, etc. Internal pointers then allow a search to begin at short words and proceed to longer words. This initialization need occur only once although each time a word is added, deleted or modified, the initialization is again performed.

With the word list initialized in this fashion, a search for a match begins by identifying the type of word. If the leading character of the group entered is found in the prefix file, then the word will be searched in the prefix category. If the trailing character is found in the suffix file, the word will be searched in the suffix category. If both are found, the word will be searched in the prefix/suffix category. If the compound indicator is identified, the word will be searched only in the compound category. If none of these are found, the word will be searched in the simple category.

Figure 2:
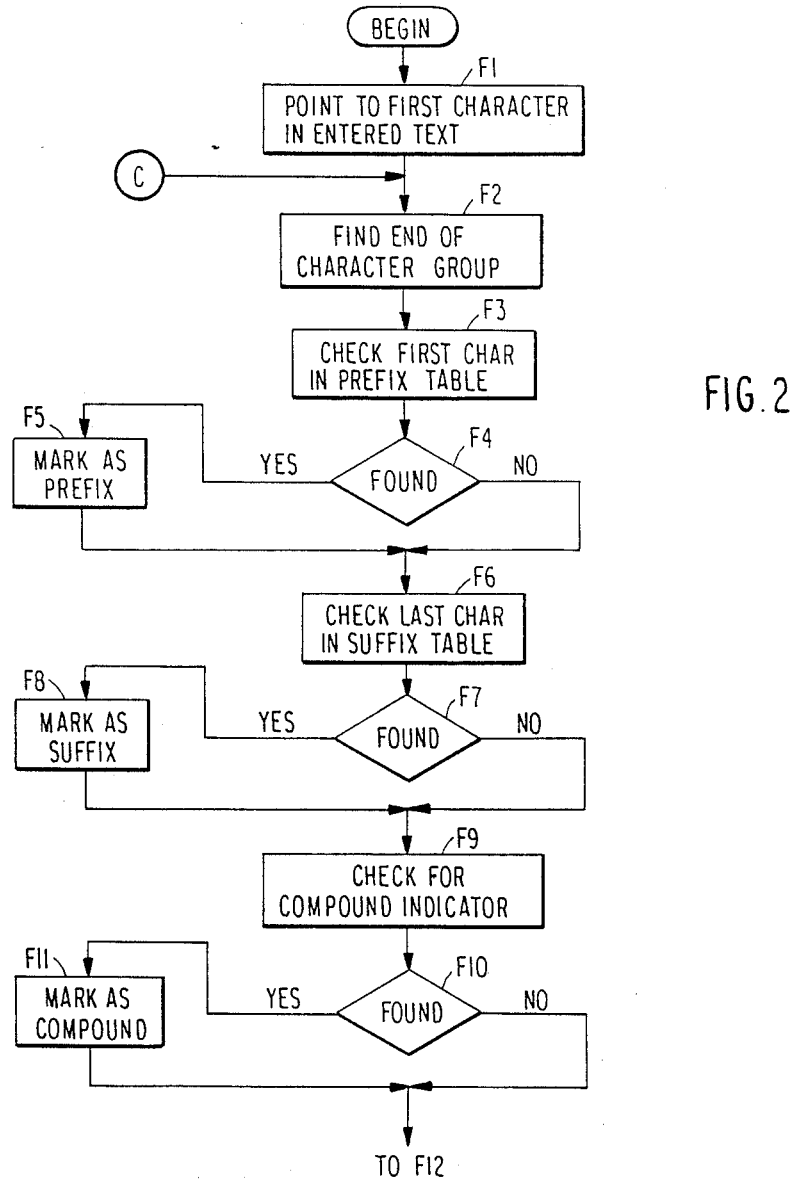
FIGS. 2-6 comprise a flow chart of processing executed in accordance with the present invention.

Reference is now made to FIG. 2 to illustrate typical processing employed in accordance with the present invention.

FIGS. 2-6 illustrate processing in accordance with one embodiment of the present invention. Referring first to FIG. 2, the processing shown assumes that the operator has entered a group of abbreviated words (or character groups) interspersed with full words and indicators for buzz words (indicated by a single character) or phrases (indicated by a double character). The first function, F1, points to the first character in entered text. Function F2 finds the end of that character group (e.g. space, punctuation character, carriage return or the like). Function F3 focuses on the first character in the entered group and checks it against the prefix table. Function F4 branches on whether the leading character in the character group was found in the prefix table. If it was, function F5 marks this character group as possibly comprising a prefix word. Either after function F5 is performed or if that function is skipped (because the leading character was not found in the prefix table), function F6 is performed to check the last character of the character group in the suffix table. Functions F7 and F8 are entirely similar to functions F4 and F5. Thereafter, function F9 is performed to check for the compound word indicator. Function F10 branches on whether it is found. If it was found, then function F11 marks the character group as a compound word. Thereafter, function F12 is performed (either after executing function F11 or if function F11 is skipped).

Figure 3:
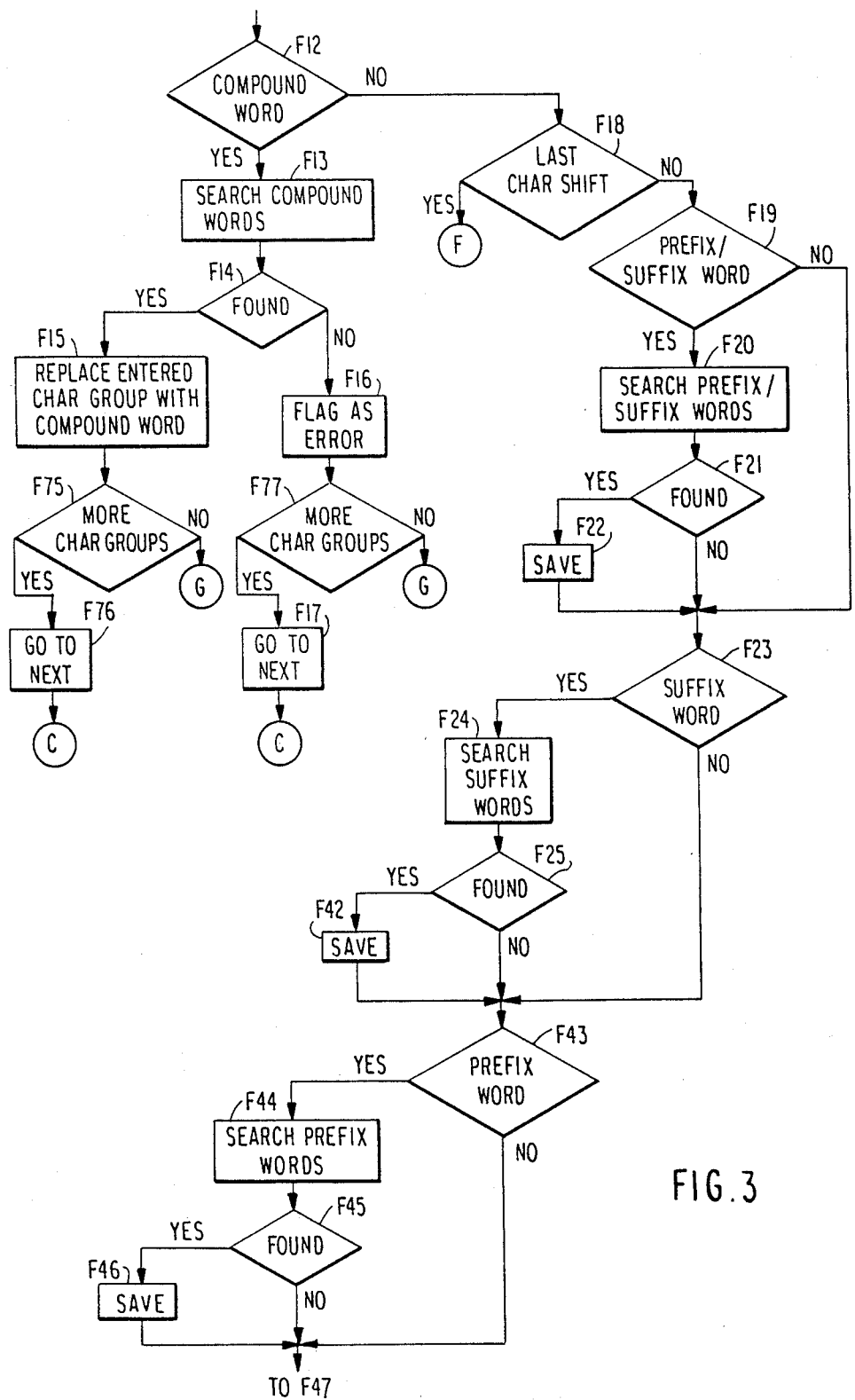
Figure 4:
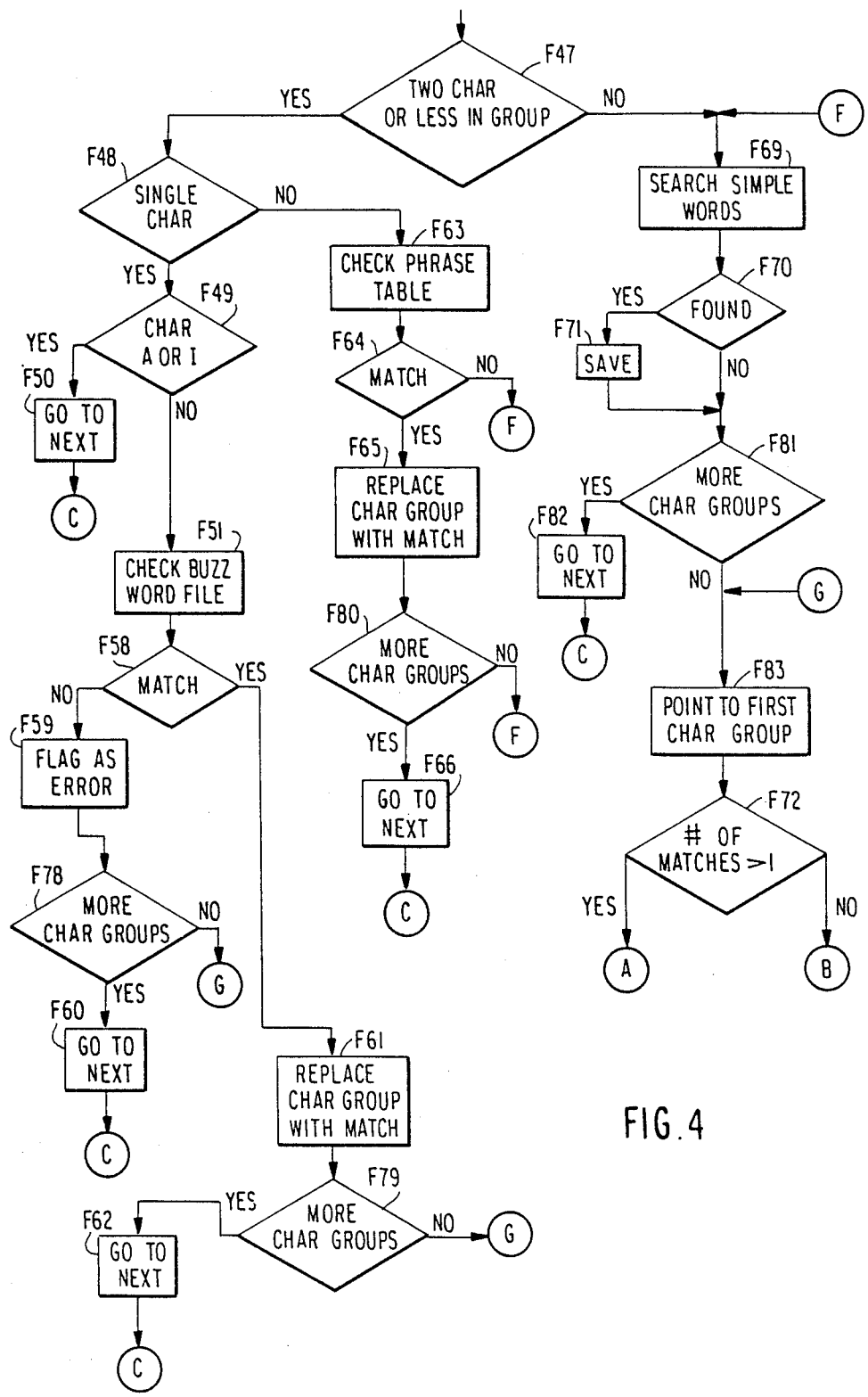

Referring now to FIG. 3, function F12 determines if the character group is a compound word. This determination is based on whether the compound indicator was found. If it is a compound word, then function F13 searches the compound word list. Function F14 branches on the result. If the entered character group matches with one of the word abbreviations in the compound word list, then the compound word was found and function F15 is performed to replace the operator-entered character group with the corresponding compound word. Function F75 checks to see if there are more character groups to process. If there are, processing loops to F76 (C). Otherwise, processing skips to F83 (G), discussed below. On the other hand, if there is no match then functions F16 and F17 are performed to flag this character group as an error and proceeds as already described.

Alternatively, if the character group being processed does not include the compound word indicator, then function F18 is performed to check to see whether the last character is in upper case form. If it is, it indicates that the word is a simple, four character word and thus processing skips to point F (which will be discussed below). Assuming, however, that the last character is not a shifted character, then function F19 is performed to determine if the character group has been marked as a possible prefix/suffix word. This of course is determined by noting that both functions F5 and F8 have marked this as both a prefix word and a suffix word. If the character group has been so marked, then function F20 is performed to search the prefix/suffix words. Function F21 branches on the result with function F22 being performed to save the match if one was found. Function F22 is otherwise skipped. After executing function F22 or F21, or if the character group is not a prefix/suffix word, then function F23 is performed. Function F23 determines if the character group may be a suffix word. If it is, functions F24 and F25 are performed and depending on the result of the execution of function F25, function F42 may be performed. These functions are analogous to functions F20, F21 and F22 and should not require further explanation.

Thereafter, functions F43, F44 and F45 (and perhaps F46) are performed in an entirely similar manner.

At the conclusion of the processing shown in FIG. 3, matches will have been found for the entered character group considered as a prefix/suffix word (if appropriate), considered as a suffix word (if appropriate) and as a prefix word (if appropriate). Thus, more than a single match may have been found in accordance with this processing. In any event, processing then proceeds to function F47.

Function F47 determines if the entered character group consists of two characters or less. If that is the case, then function F48 is performed. Function F48 branches on whether the entered character group is but a single character. If it is, then function F49 is performed which branches on whether the single character is an A or an I. If it is one of these two characters, then function F50 is performed to merely go on to the next character group since either of these characters is a word in the particular language used in the example under discussion. However, if the single entered character is neither A nor I, then function F51 checks the character against the indicators in the buzz word file. If a match is found, the character group being processed is replaced with what is found in the buzz word file and thereafter functions F62 and F79 are performed as described. If no match is found, then functions F59, F78 and F60 are performed to flag this character group as an error and go on as described.

On the other hand, if the character group being processed is not a single character group, then function F63 is performed to check the phrase table for double character groups. Function F64 branches on the result. If a match is found, then functions F65, F80 and F66 are performed which are similar to functions already described. If no match is found, processing skips to point F to check the simple words.

On the other hand, if function F47 determines that the group being processed is not two characters or less, then processing proceeds directly to function F69. Function F69 checks the simple words and function F70 branches on the result. If a match is found, function F71 saves that match and processing then proceeds the function F81.

Alternatively, if no match is found, then processing proceeds directly to function F81. Functions F81 and F82 are similar to processing already described. If entered text has been processed (no exit from F81), then F83 points to the initial character group or the word which has replaced it and F72 is performed.

Function F72 branches on whether the number of matches is greater than one. Assuming it is, processing skips to point A (see FIG. 5). Alternatively, processing proceeds to point B if there was one match or less found.

Figure 5:
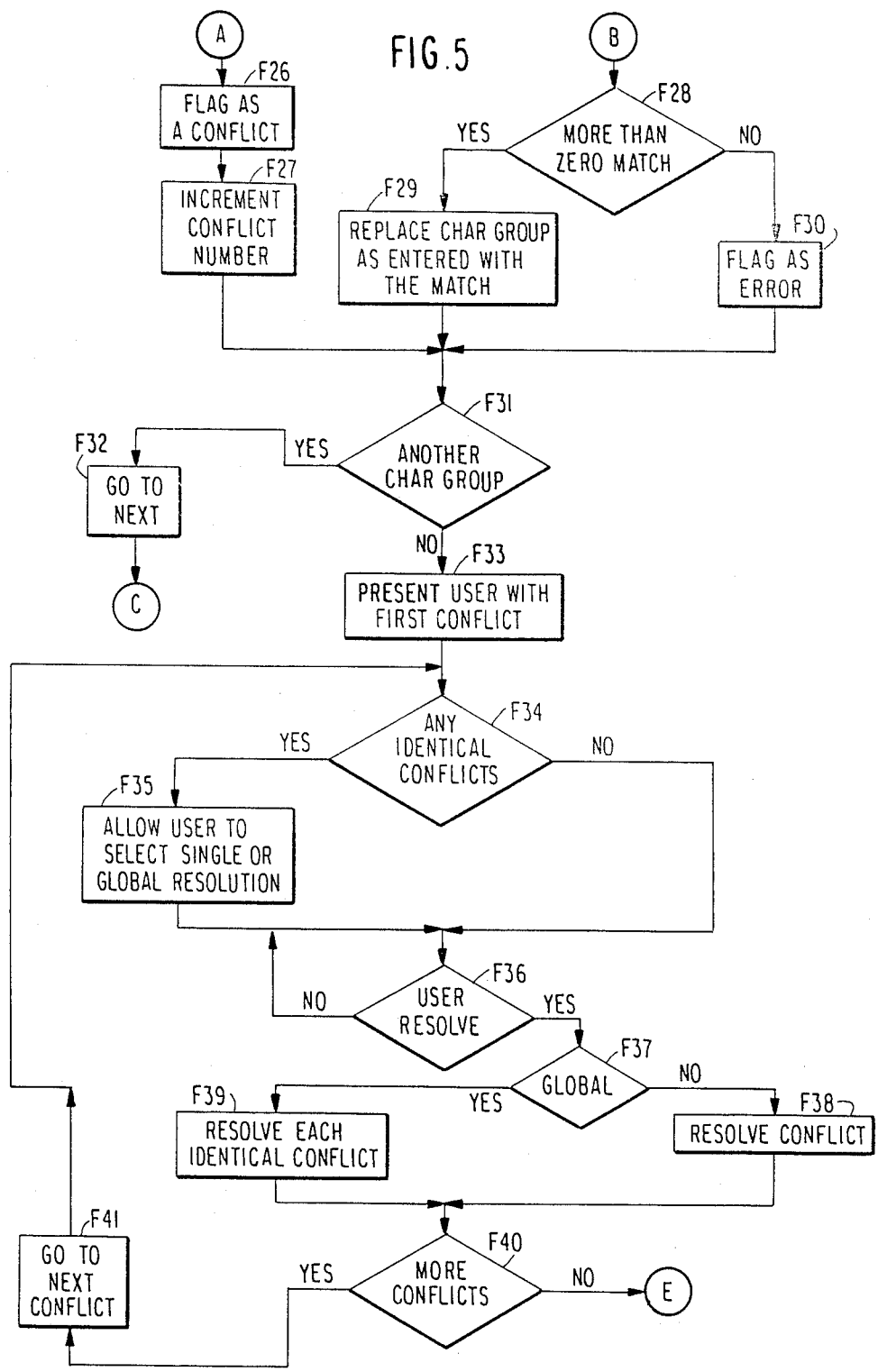

Referring now to FIG. 5, function F26 flags the character group being processed as resulting in a conflict and function F27 increments a conflict counter (the result of which will be seen below).

Figures 6, 7:
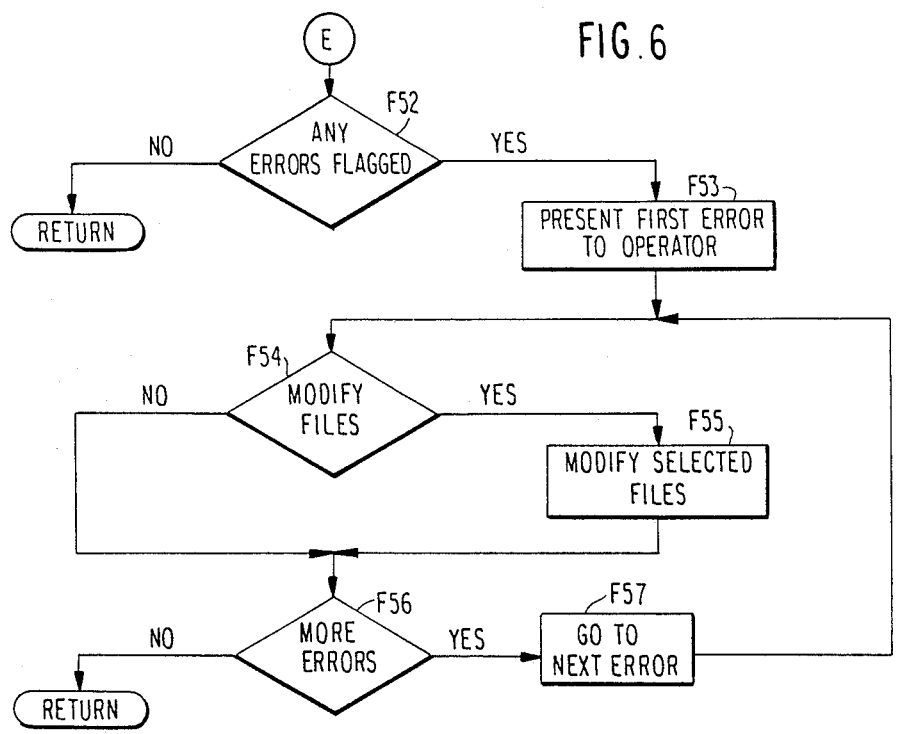
FIG. 7 is an example of a conflict resolution display.

If there is not more than a single match as a result of processing function F24, then function F28 is performed to determine if there is more than zero matches. If there is, i.e. if there is a single match, function F29 is executed and it replaces the original character group with the match found at function F24 from the word file. If there is no match, then function F30 is performed to flag the character group as including an error condition. At the conclusion of functions F27, F29 and F30, F31 is performed which branches on whether there is an additional character group to be processed. If there is, then function F32 loops back to function F3. If on the other hand there are no further character groups to process, then each character group in the entered text has been processed. Processing then steps to function F33 et seq. Function F33 presents the operator with the first conflict. This creates on the display a representation of each match from the word file (see FIG. 7). Referring to FIG. 7, the display referred to will be described. The uppermost line in the display identifies several function keys and the function performed by pressing that key. The material (four character groups) within the rectangle identifies the four character groups entered by the operator. Immediately below the rectangle and to the left is a message indicating that the character group "DCLOSS" matches more than one word in the word list. The two candidates extracted from the word list are shown in the smaller rectangle, also below the large rectangle; these candidates include "DISCLOSES" and "DISCLOSURES". While FIG. 7 does not show it, the operator can position a cursor to select one of the two (or more if necessary) candidates. By the selection, the operator resolves the conflict. Referring again to FIG. 5, the processing shown there also determines, at function F34 if there are any other instances of the identical conflict. If there are, then as indicated at F35 the operator is allowed to select a single or global conflict resolution. At function F36 the processing waits the operator's resolution. If the operator decides the resolve this on a single conflict basis, the cursor is positioned as is indicated in connection with FIG. 7 and a selected key (such as the enter key) is depressed. If the operator indicates (by the depression of an additional key) that this is a global resolution, then processing at function F37 branches to function F39. Function F39 resolves each identical conflict with the resolution effected by the operator at function F36. On the other hand if the operator did not select global resolution at function F37, then function F38 merely resolves the single conflict identified to the operator. Function F39 or F38 responds to the preferred word by replacing the character group resulting in the conflict with the word selected by the operator. Function F40 checks to see if there are additional conflicts, i.e. have we processed that number of conflicts indicated by the conflict counter (function F27)? If not function F41 steps to the next conflict and steps F33 through F40 are again performed. When function F40 branches through the No path, then function F52 (see FIG. 6) determines if there are any errors that have been flagged in the course of the processing. If no errors have been flagged, then the text has been completely processed. At this point the operator can display the processed text on a display 22, or produce a hard copy printout by using the printer 23. The operator may also store the processed text using a floppy disk or a hard disk, as desired.

On the other hand, if errors have been flagged, then function F53 presents the first error to the operator. Function F54 branches on the operator decision to modify the data base (that is, the word file, frequently used phrase file, frequently used word file, etc.). If the operator does not desire to modify the data base, then processing steps to function F56. On the other hand, if the operator desires to modify the data base, then function F55 effects the modification and then processing steps to function F56. Function F56 branches on whether or not additional errors are to be processed. If there are, function F57 increments to the next error and function F54 is again performed. When all errors have been processed, processing concludes. At this point, the operator can display the processed text, produce a hard copy printout, or store the processed text.

While the foregoing has described a particular embodiment of the invention, those skilled in the art will realize that numerous and many modifications can be effected within the spirit and scope of the invention. More particularly, the language employed to define different words, prefixes and suffixes need not of course be English.

Tables 2, 3 and 4 (reproduced below) are examples of prefix/suffix tables for Spanish, French and German, respectively. Those skilled in the art will be able to prepare prefix and suffix tables for still other languages after reviewing this disclosure.

TABLE 2

Spanish

| Prefixes | | Suffixes | |
|---|---|---|---|
| com con | c | an ar as | a |
| de | d | es er | e |
| es ex | e | ir is | i |
| im in | i | ion cion | h |
| pre pro | p | lo la | l |
| re | r | ta ra | t |
| | | to do no | o |

TABLE 3

French

| Prefixes | | Suffixes | |
|---|---|---|---|
| bi bis | b | age ard aison | a |
| com con corur | c | erie esse eur er | e |
| des de | d | isme ite ille | i |
| in im | i | ment | m |
| il ir | e | oir ois | o |
| mes me mi | m | ation ition tion | h |
| pre | p | ure ile | h |

TABLE 4

German

| Prefixes | | Suffixes | |
|---|---|---|---|
| an auf aus | a | al sal | a |
| bei | b | er ler ner | e |
| ein | e | ling ig ung | g |
| durch | d | chen en el | |
| her hin | h | keit heit | t |
| mit | m | in ik | |
| nach | n | ent ant ment | n |
| vor | v | or ar ur | r |
| uber unter um | u | tion ion | h |
| zu zuruck | z | im um tum | m |

It should be apparent that the method of the invention operates on text once it has been entered by an operator. However, the invention does not depend on the use of a keyboard for text entry. Rather, any other method of text entry can be used. For example, the text can be manually written by an operator and thereafter scanned by an optical scanner with character recognition equipment for identifying the text selected by the operator for entry into the computer. Many other forms of text entry will be apparent to those skilled in the art.

Mention has already been made that the data base includes a count field for each time a particular word is used. A further modification or enhancement to the invention provides further efficiency when specialized words are used very often in a particular document. In order to implement this particular embodiment of the invention, the count fields as loaded into memory are initialized to zero each time the program is executed. As the operator enters character groups, the count fields (since they had been initialized at zero) will indicate, for each word in the data base, the number of times it had been used in a particular document. When a count field in any word exceeds a predefined threshold (for example 15), then the program automatically signals to the operator that a high use word has been identified and furthermore selects a unique key which will thereafter be considered to represent that particular high use word. In effect, the program automatically adds high use words to the buzz word file, but the corresponding buzz word indicator is a unique key. Particular keys which can be used quite readily for this embodiment are the function keys (typical keyboards include function keys 1-10). Thus the first time such a high use word is identified, the program can assign function key F1 to this word. Thereafter, each time the operator depresses function key F1, that particular high use word is reproduced. Thereafter, if the program identifies another high use word, it will assign function key F2 with like results.

In view of the foregoing, the invention is not to be interpreted in accordance with the example described herein but rather in accordance with the claims attached hereto.

I claim:

1. A method of rapidly entering text representing alphabetic characters into a computing machine, said method comprising the steps of:
   (a) storing a file of words,
   (b) storing a file of word modifications correlating a plurality of word modification indicators and corresponding word modifications, said file of word modification indicators including at least one word modification indicator with a plurality of corresponding word modifications,
   (c) entering, into said computing machine character groups representing words and word modification indicators,
   (d) for each instance of a word modification indicator, searching said file of word modifications and extracting one or more word modifications to produce for each extracted word modification a modified character group,
   (e) thereafter, searching said file of words for a match between a character group or a modified character group and a word, and
   (f) replacing a matched character group, in said entered text with a corresponding word located in said step (e) to produce processed text.

2. A method as recited in claim 1 which includes a further step of replacing a character group producing said modified character group with a corresponding word located in said step (e).

3. A method as recited in claims 1 or 2 wherein said word modifications include prefixes.

4. A method as recited in claims 1 or 2 wherein said word modifications comprise suffixes.

5. A method as recited in claims 1 wherein said word modifications comprise prefixes and suffixes.

6. A method as recited in claim 5 wherein said step (b) comprises storing a prefix file and a suffix file.

7. A method as recited in claim 1 which includes a further step of:
   (g) identifying any instance of two or more words matching a character group or a modified character group, and
   (h) allowing an operator to select a preferred word to replace said character group.

8. A method as recited in claim 1 wherein said step (c) includes entering a unique indicator with all character groups of four characters.

9. A method as recited in claim 8 wherein said unique indicator is use of a shifted character as a last character in a four character group.

10. A method as recited in claim 1 which further includes:
   (g) storing a correlation file correlating single characters, other than word modification indicators, with frequently used words,
   (h) identifying appearance in said entered text of at least one single character stored in said correlation file of step (g), and
   (i) replacing said identified single character with that word correlated with that single character in said correlation file of step (g).

11. A method as recited in claim 1 which further includes:
   (g) storing a correlation file correlating multi character groups smaller than four character groups with frequently used phrases,
   (h) identifying appearance in said entered text of at least one multi character group stored in said correlation file of step (g), and
   (i) replacing said identified multi character group with that phrase correlated with that multi character group in said correlation file of step (g).

12. A method as recited in any of claims 1, 2, 6-8, 10 or 11 which further includes:
   (g) printing said processed text on a printer.

13. A method as recited in any of claims 1, 2, 6-8, 10 or 11 which further includes:
   (g) displaying said processed text on a display.

14. A method of rapidly entering test represented by alphabetic characters into a computing machine, said method comprising the steps of:
   (a) storing a file of words,
   (b) entering, into said computing machine character groups representing words, by entering for any selected word of a first set comprising a plurality of words, a selected set of characters of said word identified in accordance with character position in said word.

15. A method as recited in claim 14 wherein said selected set of characters comprises a subset of a given number of initial characters of said word immediately followed by a subset of a second given number of trailing characters of said word.

16. A method as recited in claim 15 wherein said given number is two and said second given number is two.

17. A method as recited in claim 15 wherein said given number is one and said second given number is three.

18. A method as recited in claim 15 wherein said given number is three and said second given number is one.

19. A method as recited in claim 14 which includes a further step of:
   (c) entering for a different set of words a second selected set of characters of said word identified in accordance with character position in said word along with a non-alphabetic symbol.

20. A method as recited in claim 19 wherein said second selected set comprises a first subset of leading characters of said word followed by said non-alphabetic symbol followed by a second subset of trailing characters of said word.

21. A method as recited in claim 19 which further includes the step of:
   (d) entering for a further different set of words a character set selected to represent a plurality of characters, larger than said character set followed by a string of characters from said word immediately adjacent said plurality of characters.

22. A method as recited in claim 21 wherein said character set represents a prefix for a word.

23. A method as recited in claim 21 wherein said character set represents a suffix for a word.

24. A method as recited in claim 22 or 23 wherein said character set consists of a single character.

25. A method as recited in claim 24 wherein said single character is an alphabetic character.

* * * * *